(12) United States Patent
Milanfar et al.

(10) Patent No.: US 7,940,282 B2
(45) Date of Patent: May 10, 2011

(54) SYSTEM AND METHOD FOR ROBUST MULTI-FRAME DEMOSAICING AND COLOR SUPER RESOLUTION

(75) Inventors: Peyman Milanfar, Menlo Park, CA (US); Sina Farsiu, Santa Cruz, CA (US); Michael Elad, Haifa (IL)

(73) Assignee: The Regents of the University of California, Santa Cruz, Oakland, CA (US)

(*) Notice: Subject to any disclaimer, the term of this patent is extended or adjusted under 35 U.S.C. 154(b) by 1296 days.

(21) Appl. No.: 11/506,246

(22) Filed: Aug. 17, 2006

(65) Prior Publication Data
US 2006/0279585 A1 Dec. 14, 2006

Related U.S. Application Data

(63) Continuation of application No. 11/301,811, filed on Dec. 12, 2005, now Pat. No. 7,412,107.

(60) Provisional application No. 60/636,891, filed on Dec. 17, 2004.

(51) Int. Cl.
G09G 5/00 (2006.01)
G09G 5/02 (2006.01)
H04N 9/04 (2006.01)
H04N 5/00 (2006.01)
H03L 7/00 (2006.01)
G03F 3/08 (2006.01)
G06K 9/00 (2006.01)
H04N 1/46 (2006.01)
G06K 9/40 (2006.01)
G06K 9/32 (2006.01)

(52) U.S. Cl. ........ 345/606; 345/589; 345/611; 345/643; 345/616; 348/273; 348/538; 348/606; 348/607; 358/512; 358/518; 358/525; 382/162; 382/254; 382/263; 382/300

(58) Field of Classification Search .......... 348/223, 348/225, 254, 273, 526, 533, 538, 606–607, 348/615–616, 620, 625; 358/504, 512, 515–518, 358/520, 525, 461, 448; 382/162–163, 166–167, 382/254–255, 263–269, 274, 299–300; 345/581, 345/589, 597, 600, 606, 611, 616–619, 639, 345/643
See application file for complete search history.

(56) References Cited

U.S. PATENT DOCUMENTS
6,452,637 B1 * 9/2002 Rudin et al. ............ 348/416.1
(Continued)

OTHER PUBLICATIONS
Hel-Or et al., "Demosaicing of Color Images Using Steerable Wavelets," HP Labs, Israel, Tech. Rep. HPL-2002-206R1 20 020 830, 2002.
(Continued)

Primary Examiner — Wesner Sajous
(74) Attorney, Agent, or Firm — Lumen Patent Firm

(57) ABSTRACT

A method of creating a super-resolved color image from multiple lower-resolution color images is provided by combining a data fidelity penalty term, a spatial luminance penalty term, a spatial chrominance penalty term, and an inter-color dependencies penalty term to create an overall cost function. The data fidelity penalty term is an L1 norm penalty term to enforce similarities between raw data and a high-resolution image estimate, the spatial luminance penalty term is to encourage sharp edges in a luminance component to the high-resolution image, the spatial chrominance penalty term is to encourage smoothness in a chrominance component of the high-resolution image, and the inter-color dependencies penalty term is to encourage homogeneity of an edge location and orientation in different color bands. A steepest descent optimization is applied to the overall cost function for minimization by applying a derivative to each color band while the other color bands constant.

12 Claims, 16 Drawing Sheets
(15 of 16 Drawing Sheet(s) Filed in Color)

U.S. PATENT DOCUMENTS

| | | | |
|---|---|---|---|
| 6,816,197 B2 * | 11/2004 | Keshet et al. | 348/273 |
| 7,379,612 B2 * | 5/2008 | Milanfar et al. | 382/254 |
| 7,412,107 B2 * | 8/2008 | Milanfar et al. | 382/254 |
| 2002/0114532 A1 * | 8/2002 | Ratner et al. | 382/266 |
| 2003/0193567 A1 | 10/2003 | Hubel | |
| 2004/0008269 A1 | 1/2004 | Zomet et al. | |
| 2006/0038891 A1 | 2/2006 | Okutomi et al. | |

OTHER PUBLICATIONS

Kimmel, Ron "Demosaicing: Image Reconstruction from Color CCD Samples" (1999) IEEE Transactions on Image Processing, vol. 8, No. 9 pp. 1221-1228.

Keren et al. "Restoring Subsampled Color Images" (1999) Machine Vision and Applications, vol. 11 pp. 197-202.

* cited by examiner (a)

(b)

(c)

(d)

(a)

(b)

(c)

(d)

SYSTEM AND METHOD FOR ROBUST MULTI-FRAME DEMOSAICING AND COLOR SUPER RESOLUTION

CROSS-REFERENCE TO RELATED APPLICATIONS

This application is cross-referenced to and claims the benefit from U.S. patent application Ser. No. 11/301,811 filed Dec. 12, 2005, now U.S. Pat. No. 7,412,107 which claims benefit of U.S. Provisional Application 60/636,891 filed Dec. 17, 2004, and which are hereby incorporated by reference.

STATEMENT REGARDING FEDERALLY SPONSORED RESEARCH OR DEVELOPMENT

The present invention was supported in part by grant number CCR-9984246 from the National Science Foundation. The U.S. Government has certain rights in the invention.

FIELD OF THE INVENTION

The invention relates generally to color digital images. More particularly, the invention relates to a system and method of fast and robust method of super-resolution and demosaicing, based on a maximum a posteriori estimation technique by minimizing multi-term cost functions.

BACKGROUND

Digital cameras have an inherent limit to their spatial resolution that is governed by the optical lens and CCD array. To improve the image quality, super-resolution can be utilized by fusing multiple low-resolution images of the same scene to produce a relatively high-resolution image.

In recent years, various super-resolution techniques have been developed for estimating a high-resolution image from a set of low-resolution images. It was demonstrated early on that the aliasing effects in the low-resolution images can be removed and the high-resolution fused image is recovered, as long as there existed a sub-pixel motion in the low-resolution input images. Even though the relatively clean frequency domain description of super-resolution provided near desired results for very simple imaging scenarios, it was evident that super-resolution in general is computationally complex and numerically ill-behaved, necessitating more sophisticated super-resolution methods be developed.

It is important to note that almost all super-resolution methods been designed to increase the resolution of a single channel (monochromatic) image, and to date there is very little work addressing the problem of color super-resolution. In addressing color super-resolution, one method uses a set of previously demosaiced color low-resolution frames and fuses them together to enhance their spatial resolution. The typical solution involves applying monochromatic super-resolution algorithms to each of the color channels independently, while using the color information to improve the accuracy of motion estimation. Another approach is transforming the problem to a different color space, where chrominance layers are separated from luminance, and super-resolution is applied only to the luminance channel. Both of these methods are suboptimal as they do not fully exploit the correlation across color bands, where ignoring the relation between different color channels will result in color artifacts in the super-resolved images. Moreover, even proper treatment of the relation between the color layers is not sufficient for removing color artifacts if the measured images are mosaiced.

For demosaicing, a color image is typically represented by combining three separate monochrome images. Ideally, each pixel reflects three data measurements; one for each of the color bands. In practice, to reduce production costs, many digital cameras have only one color measurement (red, green, or blue) per pixel. The detector array is a grid of CCD's, each made sensitive to one color by placing a color-filter array (CFA) in front of the CCD. The Bayer pattern is a very common example of such color filter. The values of the missing color bands at every pixel are often synthesized using some form of interpolation from neighboring pixel values, to estimate the underdetermined color values. This process is know as demosaicing.

Numerous demosaicing methods have been proposed through the years to solve the under-determination problem. Linear interpolation of known pixel values applied to each color band independently is one method to estimate the unknown pixel values. This approach does not consider some important information about the correlation between the color bands and results in substantial color artifacts. Because the Bayer pattern has two times the number of green pixels than the red or blue pixels, the red and blue channels are down-sampled two-times more than the green channel. Therefore, the independent interpolation of the green band will result in a more reliable reconstruction than the red or blue bands. From this, with the assumption that the red/green and blue/green ratios are similar for the neighboring pixels, the basics of the smooth hue transition method evolved.

There is a negligible correlation between the values of neighboring pixels located on the different sides of an edge in an image. Although the smooth hue transition method is logical for smooth regions of the reconstructed image, it is not useful for the high-frequency (edge) areas. Consequently, gradient-based methods were applied but did not perform interpolation across the edges of an image, where this non-iterative method uses the second derivative of the red an blue channel to estimate the edge direction in the green channel, and the green channel is then used to compute the missing values in the red and blue channels.

A modified gradient-based method was subsequently developed, where the second derivative of the green channel and the first derivative of the red (or blue) channels are used to estimate the edge direction in the green channel. The smooth hue method was later combined to provide an iterative method where the smooth hue interpolation is done with respect to the local gradient computed in eight directions about the pixel of interest. A second stage using anisotropic inverse diffusion further enhanced the quality of the reconstructed image. This two-step approach of interpolation followed by an enhancement step has been widely adopted, where spatial and spectral correlations among neighboring pixels are exploited to define the interpolation step, while adaptive median filtering is used as the enhancement step. Other iterative implementation methods of the median filters have been used as the enhancement step that take advantage of the homogeneity assumption in the neighboring pixels.

Iterative maximum a posteriori (MAP) methods are another important category of demosaicing methods. A MAP algorithm with a smooth chrominance prior has been developed, where the original image is transformed to the YIQ representation. The chrominance interpolation is preformed using isotropic smoothing. The luminance interpolation is done using edge directions computed in steerable wavelet pyramidal structure.

Almost all of the demosaicing methods are based on one or more of the following assumptions.

1) In the constructed image with the mosaicing pattern, there are more green sensors with regular pattern of distribution that blue or red ones (in the case of Bayer CFA, there are twice as many greens than red of blue pixels and each is surrounded by four green bands.
2) Most algorithms assume a Bayer CFA pattern, for which each red, green, and blue pixel is a neighbor to pixels of different color bands.
3) For each pixel, one and only one, color band value is available.
4) The pattern of pixels does not change through the image.
5) The human eye is more sensitive to the details in the luminance component of the image than the details in the chrominance component.
6) The human eye is more sensitive to chrominance changes in the low spatial frequency region than the luminance change.
7) Different color bands are correlated with each other.
8) Edges should align between color bands.

To date, the most sophisticated demosaicing methods have failed to produce satisfactory results when severe aliasing is present in the color-filtered image. Such severe aliasing occurs with inexpensive commercial still or video digital cameras having a small number of CCD pixels, where the color artifacts worsens as the number of CCD pixels decreases.

The poor quality of single-frame demosaiced images necessitates the need for improved multi-frame methods, where the information of several low-quality images are fused together to produce high-quality demosaiced images.

Accordingly, there is a need to develop more effective and efficient methods of image reconstruction to overcome the current shortcomings in the art.

SUMMARY OF THE INVENTION

The invention is a fast and robust hybrid method of super-resolution an demosaicing, based on maximum a posteriori estimation by minimizing a multi-term cost function. The invention is a method of creating a super-resolved color image from multiple lower-resolution color images. Specifically, combining a data fidelity penalty term, a spatial luminance penalty term, a spatial chrominance penalty term, and an inter-color dependencies penalty term creates an overall cost function. The data fidelity penalty term is an L1 norm penalty term to enforce similarities between raw data and a high-resolution image estimate, the spatial luminance penalty term is to encourage sharp edges in a luminance component to the high-resolution image, the spatial chrominance penalty term is to encourage smoothness in a chrominance component of the high-resolution image, and the inter-color dependencies penalty term is to encourage homogeneity of an edge location and orientation in different color bands. A steepest descent optimization is applied to the overall cost function for minimization by using the steps of applying a derivative to a first color band while having a second and a third color band held constant, applying a derivative to the second color band while having the first and the third color band held constant, and applying a derivative to the third color band while having the first and the second color band held constant.

In one embodiment of the invention, the method of super-resolution an demosaicing, based on maximum a posteriori estimation by minimizing a multi-term cost function, is a computer implemented method.

In another embodiment of the invention, the method of super-resolution an demosaicing, based on maximum a posteriori estimation by minimizing a multi-term cost function, is a digital camera-based implemented method.

The data fidelity penalty term is applied to space invariant point spread function, translational, affine, projective and dense motion models. The data fidelity penalty term is enabled by fusing the lower-resolution images to estimate a blurred higher-resolution image, and estimating a deblurred image from the blurred higher-resolution image, where the blurred higher-resolution image is a weighted mean of all measurements of a given pixel after zero filling and motion compensation. Further, the data fidelity penalty term uses motion estimation errors with the $L_1$ norm in a likelihood fidelity term, where the $L_1$ norm is used for measuring the difference between the projected estimate of the high-resolution image and each low-resolution image, removing outliers in the data and errors due to possibly inaccurate motion estimation.

The spatial luminance penalty term uses bilateral-TV regularization that is a luminance image having a weighted sum of color vectors, a horizontal pixel-shift term, a vertical pixel-shift term, and a scalar weight between 0 and 1, where the color vectors include red, green and blue vectors, where this regularization term is used for spatially regularizing the luminance component, resulting in sharp edges and forcing interpolation along the edges and not across them.

The spatial chrominance penalty term uses regularization based on an L2 norm to smooth the chrominance component.

The inter-color dependencies penalty term is a vector outer product norm of all pairs of neighboring pixels, where this regularization term is used to force similar edge location and orientation in different color channels.

Direct image operator effects including blur, high-pass filtering, masking, down-sampling, and shift are implemented in place of matrices for process speed and memory efficiency.

The lower-resolution color images include color filtered images, compressed color images, compressed color filtered images, and an image sequence with color artifacts.

BRIEF DESCRIPTION OF THE FIGURES

The file of this patent contains at least one drawing executed in color. Copies of this patent with color drawing(s) will be provided by the Patent and Trademark Office upon requite and payment of the necessary fee.

The objectives and advantages of the present invention will be understood by reading the following detailed description in conjunction with the drawing, in which:

FIG. 9a shows a low-resolution image captured from a commercial webcam.

FIG. 9b shows the image of FIG. 8a with shift-and-add reconstruction applied.

FIG. 9c shows the image of FIG. 8a with the individual implementation of super-resolution.

FIG. 9d shows the image of FIG. 8a a modified gradient-based reconstruction method applied to each color band.

FIG. 9e shows a zoomed image of FIG. 8a.

FIG. 9f shows a zoomed image of FIG. 8b.

FIG. 9g shows a zoomed image of FIG. 8c.

FIG. 9h shows a zoomed image of FIG. 8d.

FIG. 11a shows a zoomed image of FIG. 9a.

FIG. 11b shows a zoomed image of FIG. 9b.

FIG. 11c shows a zoomed image of FIG. 9c.

FIG. 11d shows a zoomed image of FIG. 9d.

FIG. 12a shows a low-resolution image demosaiced using a gradient-based method.

FIG. 12b shows a low-resolution image demosaiced using a modified gradient-based reconstruction method applied to each color band with combining a gradient-based and smooth hue method.

FIG. 12c shows the super-resolution method of the current invention applied to 31 low-resolution images and demosaiced using the method of FIG. 11a.

FIG. 12d shows the super-resolution method of the current invention applied to 31 low-resolution images and demosaiced using the method of FIG. 11b.

FIG. 12e shows the super-resolution method of the current invention applied to undemosaiced raw low-resolution images.

FIG. 12f shows the multi-frame and super-resolution of color images method of the current invention applied to undemosaiced raw low-resolution images.

FIG. 13a shows a zoomed image of FIG. 11a.

FIG. 13b shows a zoomed image of FIG. 11b.

FIG. 13c shows a zoomed image of FIG. 11c.

FIG. 13d shows a zoomed image of FIG. 11d.

FIG. 13e shows a zoomed image of FIG. 11e.

FIG. 13f shows a zoomed image of FIG. 11f.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
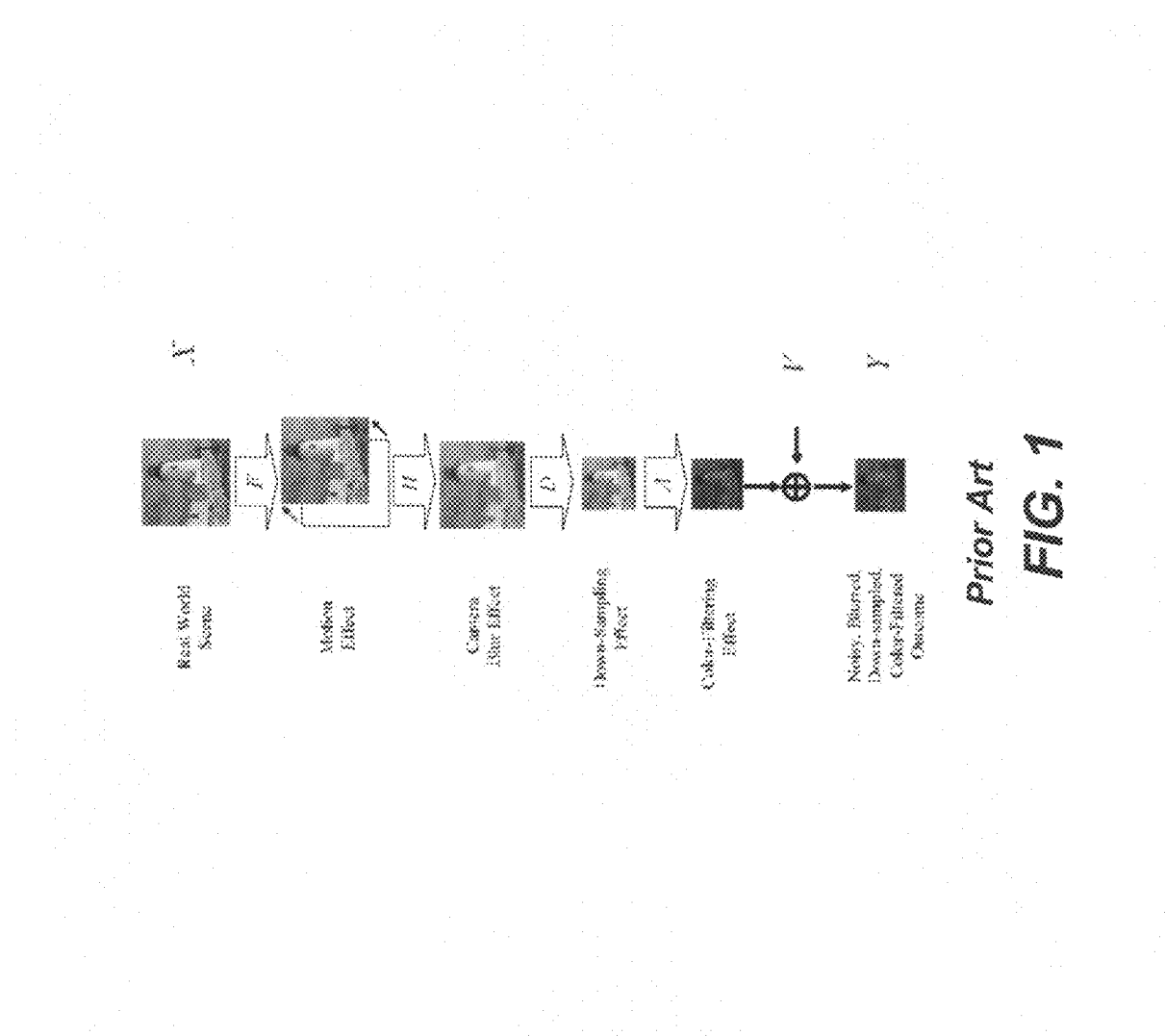
FIG. 1 shows a common image formation process for commercial digital cameras.

FIG. 1 depicts an image formation process common to many commercial CCD cameras. Shown is a real world scene "X" converted to an image that undergoes deformations when captured. The captured real world scene first undergoes a motion distortion, or warp "F", that may be caused by handheld camera motion, where FIG. 1 depicts a vertical and horizontal motion distortion. Inherent to the camera are imperfections in the camera lens and charged coupled device (CCD) that distorts the real world wavefront, causing blur "H" in the recorded image. The captured image is further distorted from information down-sampling "D" to reduce the file size of the image. Additional distortion is created from color-filtering "A" to the camera CCD element, and inherent camera noise "V". These distortions result in a noisy, blurred, down-sampled and color-filtered low-resolution image "Y".

FIG. 1 illustrates the image degradation model, where the approximated forward model is represented by the following equation:

$$\underline{Y}_i(k) = D_i(k)H(k)F(k)\underline{X}_i + \underline{V}_i(k)$$
$$= T_i(k)\underline{X}_i + \underline{V}_i(k)$$
$$k = 1, \ldots, N$$
$$i = R, G, B$$

which can be expressed as $$\underline{Y} = T\underline{X} + \underline{V}$$

The vectors $\underline{X}_i$ and $\underline{Y}_i(k)$ are representing the $i^{th}$ band (R, G, of B) of the high-resolution color frame and the $k^{th}$ low-resolution frame after lexicographic ordering, respectively. Matrix $F(k)$ is the geometric motion operator between the high-resolution and low-resolution frames, and $H(k)$ is a blur matrix to model the camera's point spread function. The matrix $D_i(k)$ represents the down-sampling operator, which includes both the color-filtering and the CCD down sampling operations. Geometric motion, blur, and down-sampling operators are covered by the operator $T_i(k)$, referred to here as the system matrix. The vector $\underline{V}_i(k)$ is the system noise and N is the number of available low-resolution frames.

The high-resolution color image (X) is of size $[12r^2M^2 \times 1]$, where r is the resolution enhancement factor. The size of the vectors $\underline{V}_G(k)$ and $\underline{Y}_G(k)$ is $[2M^2 \times 1]$ and vectors $\underline{V}_R(k)$, $\underline{Y}_R(k)$, $\underline{V}_B(k)$ and $\underline{Y}_B(k)$ are of size $[M^2 \times 1]$. The geometric motion and blur matrices are of size $[4r^2M^2 \times 4r^2M^2]$. The down-sampling and system matrices are of size $[2M^2 \times 4r^2M^2]$ for the green band and of size $[M^2 \times 4r^2M^2]$ for the red and blue bands.

Considered separately, super-resolution and demosaicing models are special cases, and in the super-resolution case, the effect of color-filtering is generally ignored to simplify the model, giving $$\underline{Y}(k) = D(k)H(k)F(k)\underline{X} + \underline{V}(k) \quad k=1,\ldots N$$

In this model, the low-resolution images $\underline{Y}(k)$ and the high-resolution image X are assumed to be monochromatic. Alternatively in the demosaicing case, only single frame reconstruction of color images is considered, resulting in a simplified model $$\underline{Y}_i = D_i\underline{X}_i + \underline{V}_i \quad i=R, G, B$$

As such, the approach to multi-frame reconstruction of color images has been a two-step process:
1) Solve $\underline{Y}_i = D_i\underline{X}_i + \underline{V}_i$ i=R, G, B for each image (demosaicing).
2) Use $\underline{Y}(k) = D(k) H(k) F(k)X + V(k)$ k=1, ..., N to fuse the low-resolution images resulting from step (1). This two-step method is known to be suboptimal.

One aspect of the current invention uses a maximum a posteriori (MAP) estimation to directly solve step (1).

Figure 2:
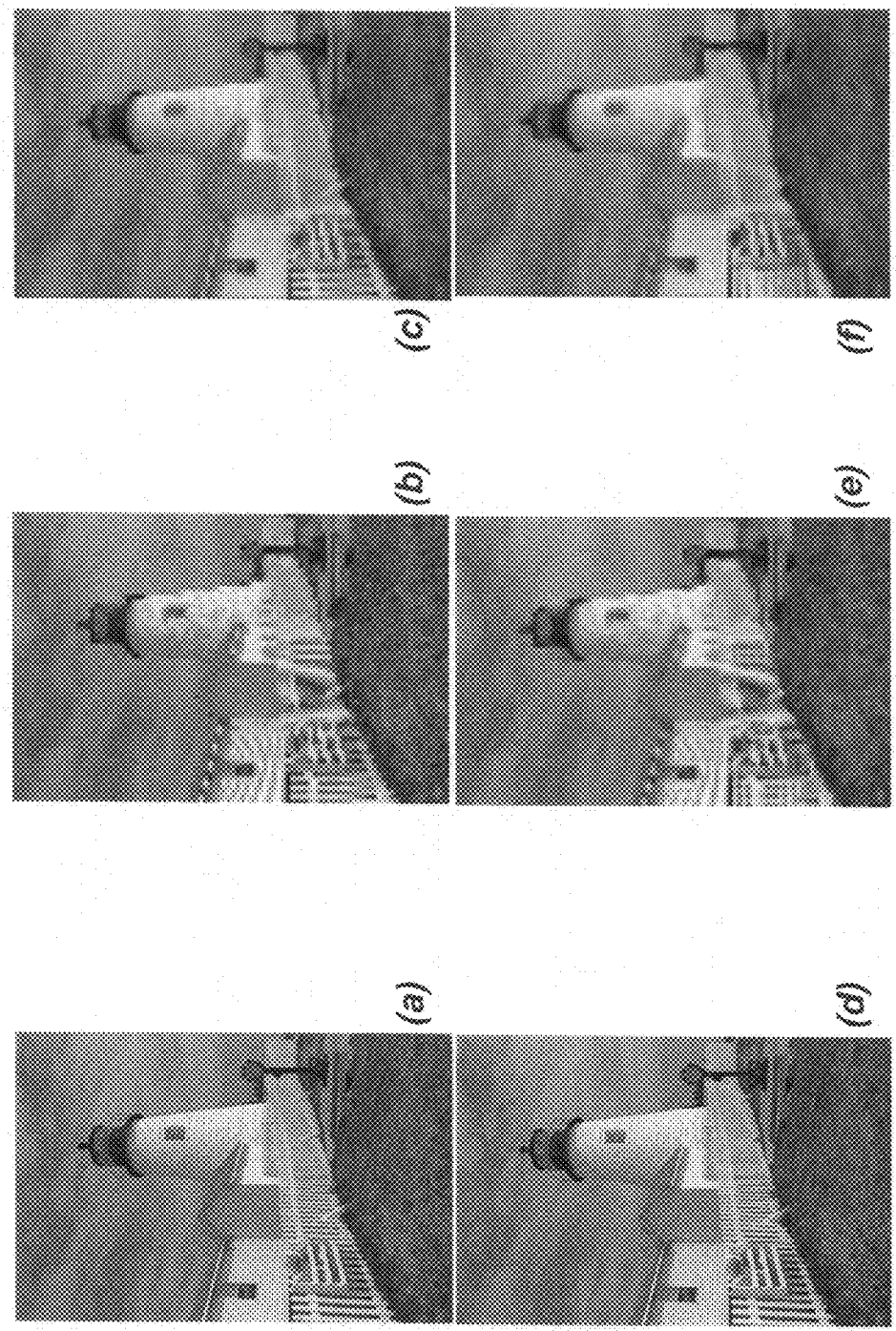
FIG. 2a shows a high-resolution image captured by a 3-CCD camera.
FIG. 2b shows the image of FIG. 2a with a down sampling factor of 4.
FIG. 2c shows the image of FIG. 2a with down sampling after low-pass filtering.
FIG. 2d shows the image of FIG. 2a after demosaicing by applying combined smooth hue and gradient-based reconstruction methods.
FIG. 2e shows the image of FIG. 2a after applying conventional color filtering then demosaicing.
FIG. 2f shows the image of FIG. 2a after applying conventional color filtering, demosaicing and low-pass filtering.

The forward model depicted in FIG. 1 is illustrated by the series of images shown in FIGS. 2a-2f. Previous methods of image reconstruction are examined here, where their shortcomings are evident in the resulting images. Controlled tests are provided, where a high-resolution image is distorted according to known parameters and reconstructed using different techniques and the results are compared to demonstrate the enabling aspects of the current invention. FIG. 2a shows a high-resolution image captured by a 3-CCD camera, where if a 1-CCD camera with the same number of pixels were used, the inevitable mosaicing process would result in color artifacts. FIG. 2b shows the image of FIG. 2a with a down sampling factor of 4, which induces color artifacts. These color artifacts may be reduced by applying low-pass filtering to the input data before color-filtering, as shown in FIG. 2c. FIG. 2d shows the image of FIG. 2a after demosaicing by applying combined smooth hue and gradient-based reconstruction methods, showing some negligible artifacts on the edges. FIG. 2e shows the demosaiced image of FIG. 2a after applying conventional color filtering then demosaicing. FIG. 2f shows the image of FIG. 2a after applying conventional color filtering, demosaicing and low-pass filtering, where the image of FIG. 2f shows less color artifacts that FIG. 2e. As shown, the poor quality of these single frame demosaiced images illustrates the need for improved reconstruction methods.

Figure 3:
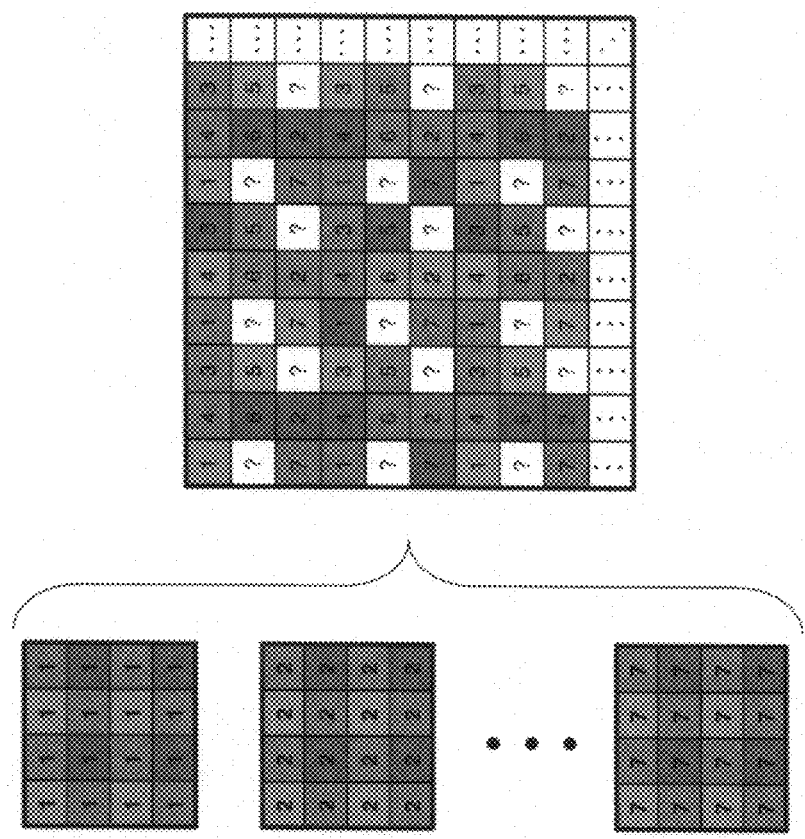
FIG. 3 shows the results of treating the green channel differently that the red or blue channel.

Single frame and multi-frame demosaicing problems are fundamentally different, making it impossible to simply cross apply traditional demosaicing methods to the multi-frame situation. For example, with respect to translational motion, a set of color-filtered low-resolution images are provided. FIG. 3 depicts such color-filtered low-resolution images on the left side, where a shift-and-add reconstruction image is depicted on the right side, illustrating the pattern of the sensor measurements in the high-resolution image grid. In this scenario, the sampling pattern is arbitrary and depends on the relative motion of the low-resolution images. It is evident that single-frame demosaicing designed for the original Bayer pattern and multi-frame demosaicing problems are very different.

FIG. 3 shows that treating the green channel differently than the red or blue channels, as done in many single-frame demosaicing methods before, is not useful for multi-frame applications. While, globally, there are more green pixels than blue or red pixels, locally, any pixel may be surrounded by only red or blue colors, and thus, there in no preference for one color band over another.

The availability of one and only one color band value for each pixel is not a correct assumption in the multi-frame case. In underdetermined cases, there are not enough measurements to fill the high-resolution grid; the symbol "?" depicted in FIG. 3 represents these underdetermined pixels. In overdetermined cases, there may be more than one color value available for some pixels.

Following the forward model from FIG. 1 of:

$$\underline{Y}_i(k) = D_i(k)H(k)F(k)\underline{X}_i + \underline{V}_i(k)$$
$$= T_i(k)\underline{X}_i + \underline{V}_i(k)$$
$$k = 1, \ldots, N$$
$$i = R, G, B$$

the issue at hand is an inverse problem, where the source of the information (high-resolution image) is estimated from the observed data (low-resolution images). An inherent difficulty with inverse problems is the challenge of inverting the forward model without amplifying the effect of noise in the measured data. In many real scenarios, the problem is worsened by the fact that the system matrix T is singular of ill-conditioned. Thus, for the problem of super-resolution, some form of regularization must be included in the cost function to stabilize the problem or constrain the space of solutions.

From a statistical perspective, regularization is incorporated as a priori knowledge about the solution. Thus, using the MAP estimator, a novel class of regularization functions emerges, enabling the capture of the specifics of a desired application. These aspects of the current invention are accomplished by applying the steps of hybrid-Lagrangian penalty terms as in $$\hat{X} = \text{Arg}_X \text{Min}[\rho(\underline{Y}, T\underline{X}) + \lambda \Gamma(\underline{X})]$$

where $\rho$, the data fidelity term, measures the "distance" between the model and measurements, and $\Gamma$ is the regularization cost function, which imposes a penalty on the unknown X to direct it to a better formed solution. The regularization parameter $\lambda$ is a scalar for properly weighing the first term (data fidelity cost) against the second term (regularization cost).

A Tikhonove regularization, of the form $\Gamma(X) = \|\Lambda X\|_2^2$ is known to have been used to penalize energy in the higher frequencies of the solution, providing a smooth but blurry image. To achieve reconstructed images with sharper edges, a robust regularizer called Bilateral-TV (B-TV) was introduced, having the form $$\Gamma(X) = \sum_{l=-P}^{P} \sum_{m=-P}^{P} \alpha^{|m|+|l|} \|X - S_x^l S_y^m X\|_1$$

where $S_x^l$ and $S_y^m$ are the operators corresponding to shifting the images represented by $\underline{X}$ by l pixels in the horizontal direction and m pixels in the vertical direction, respectively. This cost function in effect computes derivatives across multiple scales of resolution (as determined by parameter P). The scalar weight $0<\alpha<1$ is applied to give a spatially decaying effect to the summation of the regularization term. The parameter "P" defines the size of the corresponding bilateral filter kernel.

Multi-frame demosaicing is fundamentally different than single-frame demosaicing, where the current invention uses a computationally efficient maximum a posteriori (MAP) estimation method to fuse and demosaic a set of low-resolution frames, which may have been color-filtered by any color filtering array, resulting in a color image with higher spatial resolution and reduced color artifacts. The lower-resolution color images include color filtered images, compressed color images, compressed color filtered images, and an image sequence with color artifacts. The MAP-base cost function consists of a data fidelity penalty term, a spatial luminance penalty term, a spatial chrominance penalty term, and an inter-color dependencies penalty term. The current invention is a computer-implemented method of creating a super-resolved color image from multiple lower-resolution color images. Specifically, combining the data fidelity penalty term, the spatial luminance penalty term, the spatial chrominance penalty term, and the inter-color dependencies penalty term creates an overall cost function.

In the current invention, the data fidelity penalty term measures the similarity between the resulting high-resolution image and the original low-resolution images. Statistical analysis of noise properties, for many real image sequences used for multi-frame image fusion techniques, reveals that a heavy-tailed Laplacian-type distribution, versus a zero mean Gaussian distribution, is an appropriate model when applied to motion estimation errors. The data fidelity penalty term in the current invention uses motion estimation errors containing the $L_1$ norm that is robust to data outliers $$\rho(\underline{Y}, T\underline{X}) = \|\underline{Y} - T\underline{X}\|_1$$

where the $L_1$ norm is the maximum likelihood estimate of data in the presence of Laplacian noise. The $L_1$ norm minimization of the error term results in robust reconstruction of the high-resolution image in the presence of uncertainties such as motion error. With respect to general motion and blur models the data fidelity penalty term is defined as $$J_0(\underline{X}) = \sum_{i=R,G,B} \sum_{k=1}^{N} \|D_i(k) H(k) F(k) \underline{X}_i - \underline{Y}_i(k)\|_1$$

where the vectors $\underline{X}_i$ and $\underline{Y}_i(k)$ are the $i^{th}$ band (red, green or blue) of the high-resolution color frame and the $k^{th}$ low-resolution frame, respectively. The matrix $D_i(k)$ represents the down-sampling operator, which includes both the color-filtering and CCD down-sampling operations. $F(k)$ is the geometric motion operator between the high-resolution and low-resolution frames, and $H(k)$ is a blur matrix to model the camera's point spread function. The data fidelity penalty term is an $L_1$ norm penalty term to enforce similarities between raw data and a high-resolution image estimate, that measures the difference between the projected estimate of the high-resolution image and each low-resolution image, removing outliers in the data and errors due to possibly inaccurate motion estimation.

The data fidelity penalty term is applied to space invariant or variant point spread function (PSF), and general motion models. The data fidelity penalty term is enabled by fusing the lower-resolution images to estimate a blurred higher-resolution image, and estimating a deblurred image from the blurred higher-resolution image, where the blurred higher-resolution image is a weighted mean of all measurements of a given pixel after zero filling and motion compensation. Further, the data fidelity penalty term uses motion estimation errors with the L1 norm in a likelihood fidelity term. However, in considering only simpler cases of common space invariant PSF and translational, affine, projective and dense motion models, a two-step method is invoked to represent the data fidelity penalty term to ensure faster implementation, where the data fidelity term is defined as:

$$J_0(\underline{X}) = \sum_{i=R,G,B} \|\Phi_i(H \underline{\hat{X}}_i - \underline{\hat{Z}}_i)\|_1$$

where $\underline{\hat{Z}}_R$, $\underline{\hat{Z}}_G$ and $\underline{\hat{Z}}_B$ are the three color channels of the color shift-and-add image $\hat{Z}$. The matrix $\Phi_i$ (i=R, G, B) is a diagonal matrix with diagonal values equal to the square root of the number of measurements that contributed to make each element if $\hat{Z}_i$ (in the square case is the identity matrix). The undefined pixels of $\hat{Z}_B$ have no effect on the high-resolution estimation of the high-resolution frame. The $\Phi_i \in \{R, G, B\}$ matrices for the multi-frame demosaicing problem are sparser than the corresponding matrices in the color SR case. The vectors $\underline{\hat{X}}_R$, $\underline{\hat{X}}_G$ and $\underline{\hat{X}}_B$ are the three color components of the reconstruction high-resolution image $\hat{X}$.

Because the human eye is more sensitive to the details in the luminance component of an image than the details in the chrominance components, it is important that the edges in the luminance component of the reconstructed high-resolution image look sharp. The spatial luminance penalty term is to encourage sharp edges in a luminance component to the high-resolution image. To achieve reconstructed images with sharper edges, a bi-lateral TV regularizer is used as a basis for the spatial luminance cost function, were the bi-lateral TV regularization is applied to the luminance component of the image $\underline{X}$, where the luminance image is represented as the weighted sum $\underline{X}_L = 0.299 \underline{X}_R + 0.597 \underline{X}_G + 0.114 \underline{X}_B$. Here the spatial luminance penalty term is defined by $$J_1(\underline{X}) = \sum_{l=-P}^{P} \sum_{m=-P}^{P} \alpha^{|m|+|l|} \|\underline{X}_L - S_x^l S_y^m \underline{X}_L\|_1$$

where $S_x^l$ and $S_y^m$ are the operators corresponding to shifting the image represented by $\underline{X}$ by l pixels in the horizontal direction and m pixels in the vertical direction, respectively. This cost function effectively computes derivatives across multiple scales of resolution (as determined by parameters P). The scalar weight $0<\alpha<1$ is applied to give a spatially decaying effect to the summation of the regularization term. The parameter "P" defines the size of the corresponding bilateral filter kernel.

The spatial luminance penalty term uses bilateral-TV regularization that is a luminance image having a weighted sum of color vectors, a horizontal pixel-shift term, a vertical pixel-shift term, and a scalar weight between 0 and 1, where the color vectors include red, green and blue vectors.

The spatial chrominance penalty term is to encourage smoothness in a chrominance component of the high-resolution image. Spatial regularization is required also for chrominance layers. Because human visual system sensitivity is less sensitive to the resolution of the chrominance layer bands, a simpler regularization based on the $L_2$ norm is used to provide a spatial chrominance penalty term $$J_2(\underline{X}) = \|\Lambda \underline{X}_{C1}\|_2^2 + \|\Lambda \underline{X}_{C2}\|_2^2$$

where the images $\underline{X}_{C1}$ and $\underline{X}_{C2}$ are the I and Q layers in the YIQ color space representation. The spatial chrominance penalty term uses regularization based on an $L_2$ norm.

Although different bands may have larger or smaller gradient magnitudes at a particular edge, it is reasonable to assume the same edge orientation and location for all color channels. That is, if an edge appears in the red band at a particular location and orientation, then an edge with the same location and orientation should appear in the other color bands. Therefore, a cost function that penalizes the difference in edge location and/or orientation of different color bands incorporates the correlation between different color bands prior.

In the current invention, to remove color artifacts, an inter-color dependencies penalty term is used to encourage homogeneity of an edge location and orientation in different color bands, where this term penalizes the mismatch between locations or orientations of edges across the color bands. This penalty term has the vector outer product norm of all pairs of neighboring pixels, where the inter-color dependencies penalty term is a differentiable cost function $$J_3(\underline{X}) = \sum_{l=-1}^{1} \sum_{m=-1}^{1} \left[ \|\underline{X}_G \odot S_x^l S_y^m \underline{X}_B - \underline{X}_B \odot S_x^l S_y^m \underline{X}_G\|_2^2 + \right.$$
$$\|\underline{X}_B \odot S_x^l S_y^m \underline{X}_R - \underline{X}_R \odot S_x^l S_y^m \underline{X}_B\|_2^2 +$$
$$\left. \|\underline{X}_R \odot S_x^l S_y^m \underline{X}_G - \underline{X}_G \odot S_x^l S_y^m \underline{X}_R\|_2^2 \right]$$

where $\odot$ is the element by element multiplication operator. The inter-color dependencies penalty term is a vector outer product norm of all pairs of neighboring pixels.

The overall cost function is the summation of the cost functions:

$$\hat{X} = \underset{\underline{X}}{\text{ArgMin}}[J_0(\underline{X}) + \lambda' J_1(\underline{X}) + \lambda'' J_2(\underline{X}) + \lambda''' J_3(\underline{X})]$$

A steepest descent optimization is applied to the overall cost function for minimization by using the steps of applying a derivative to a first color band while having a second and a third color band held constant, applying a derivative to the second color band while having the first and the third color band held constant, and applying a derivative to the third color band while having the first and the second color band held constant.

Direct image operator effects including blur, high-pass filtering, masking, down-sampling, and shift are implemented in place of matrices for process speed and memory efficiency.

Figure 4:
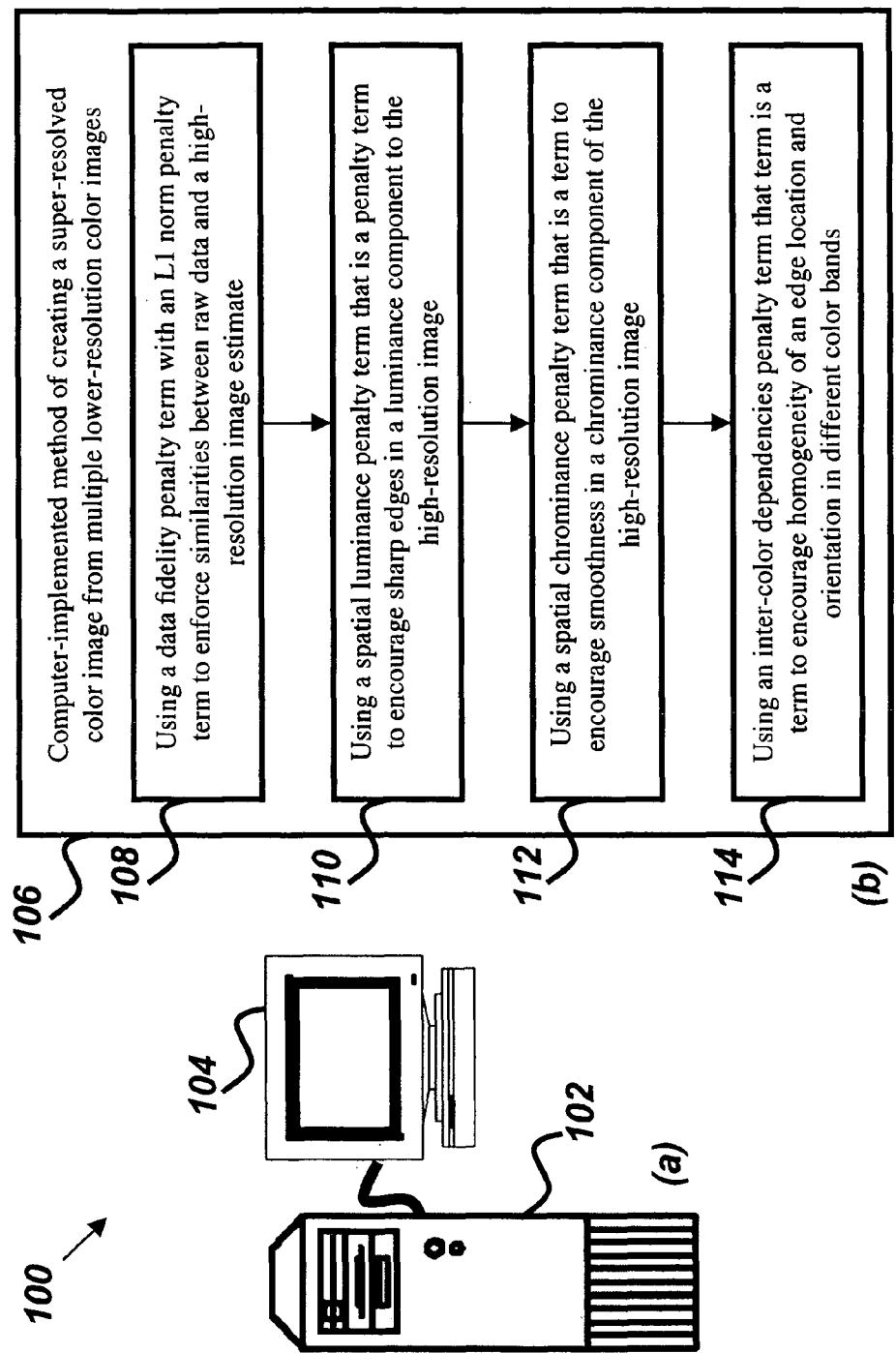
FIGS. 4a-b shows the current invention of a computer implemented system and method.

FIGS. 4a-b depict the current invention of a computer implemented system and method 100 for robust multi-frame demosaicing and color super resolution, where shown in FIG. 4a is a computer 102 and monitor 104 for processing and displaying color images created by a digital cameras (not shown). FIG. 4b shows the steps of the computer-implemented method of creating a super-resolved color image from multiple lower-resolution color images 106, where the steps include using a data fidelity penalty term with an L1 norm penalty term to enforce similarities between raw data and a high-resolution image estimate 108, using a spatial luminance penalty term that is a penalty term to encourage sharp edges in a luminance component to the high-resolution image 110, using a spatial chrominance penalty term that is a term to encourage smoothness in a chrominance component of the high-resolution image 112, and using an inter-color dependencies penalty term that term is a term to encourage homogeneity of an edge location and orientation in different color bands 114.

In one embodiment of the invention, the method of super-resolution an demosaicing, based on maximum a posteriori estimation by minimizing a multi-term cost function, is a computer implemented method.

In another embodiment of the invention, the method of super-resolution an demosaicing, based on maximum a posteriori estimation by minimizing a multi-term cost function, is a digital camera-based implemented method.

Sample experiments on synthetic and real data sets are provided to demonstrate the aspects of the current invention. In a first experiment, a sequence of low-resolution frames from an original high resolution color image with full RGB values were created. The low-resolution frames were synthesized by shifting the high-resolution image by one pixel in the vertical direction. The point spread function (PSF) was simulated for each color band of the shifted image by convolving with a symmetric Gaussian low-pass filter of size 5×5 having standard deviation equal to one. The resulting image was sub-sampled by a factor of 4 in each direction. This process was repeated with different motion vectors (shifts) in vertical and horizontal directions to produce 10 low-resolution images from the original scene. The horizontal shift between the low resolution images varied between 0 to 0.75 pixels in the low-resolution grid (0 to 3 pixels in the high-resolution grid). The vertical shift between the low-resolution images varied between 0 to 0.5 pixels in the low-resolution grid (0 to 2 pixels in the high-resolution grid). To simulate the errors in motion estimation, a bias equal to half a pixel shift in the low-resolution grid was intentionally added to the known motion vector of one of the low-resolution frames. Gaussian noise was added to the resulting low-resolution frames to achieve a signal-to-noise ratio (SNR) equal to 30 dB. Each low-resolution color image was further sub-sampled by the Bayer filter.

FIG. 5a shows the color image of the sample experiment with full RGB values. FIG. 5b shows the Bayer filtered low-resolution images of FIG. 5a reconstructed by a gradient-based reconstruction method. FIG. 5c shows the Bayer filtered low-resolution image of FIG. 5a demosaiced by applying combined smooth hue and gradient-based reconstruction methods. Because the motion model in this case is translational and blur kernel space invariant, a fast model of the combined smooth hue and gradient-based reconstruction methods may be used to reconstruct the blurry image ($\hat{Z}$) on the high-resolution grid. The shift-and-add result of the demosaiced low-resolution frames after bilinear interpolation, before deblurring and demosaiceing is shown in FIG. 5d. The result of the shift-and-add method was used as the initialization of the iterative multi-frame demosaicing methods.

The original set of frames (raw data) was used to reconstruct a high-resolution image with reduced color artifacts.

Figure 5:
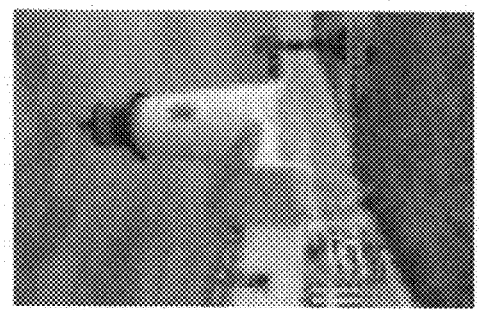
FIG. 5a shows a color image with full RGB values.
FIG. 5b shows a Bayer filtered low-resolution image of FIG. 4a reconstructed by applying a gradient-based reconstruction method.
FIG. 5c shows a Bayer filtered low-resolution image of FIG. 4a demosaiced by applying combined smooth hue and gradient-based reconstruction methods.
FIG. 5d shows a Bayer filtered low-resolution image of FIG. 4a after applying shift-and-add.
Figure 5:
Figure 5:
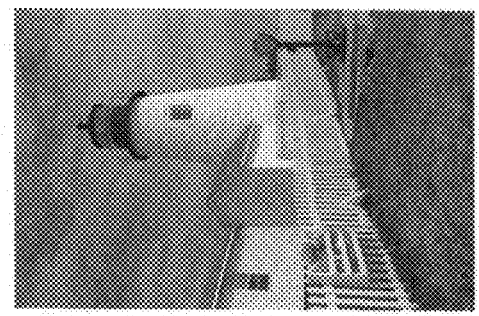
Figure 5:
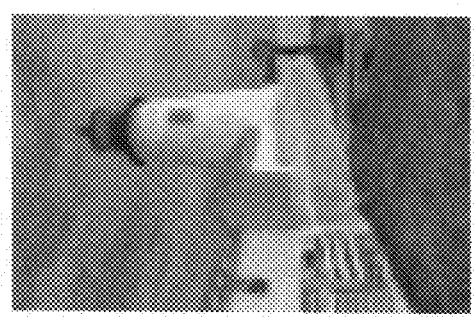
Figure 6:
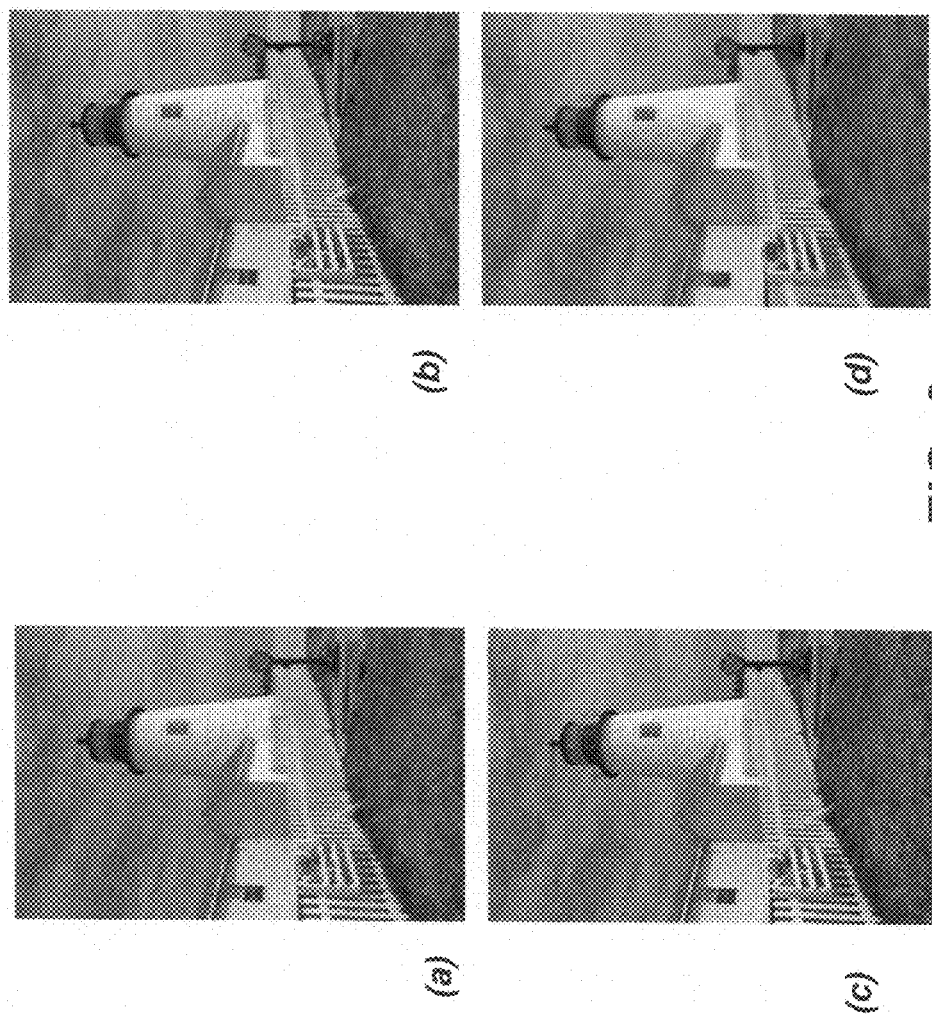
FIG. 6a shows a low-resolution image reconstructed with luminance regularization.
FIG. 6b shows a low-resolution image reconstructed with inter-color regularization.
FIG. 6c shows a low-resolution image reconstructed with chrominance regularization.
FIG. 6d shows a low-resolution image reconstructed from low-resolution demosiacing by applying combined smooth hue and gradient-based reconstruction and super-resolution methods.
Figure 7:
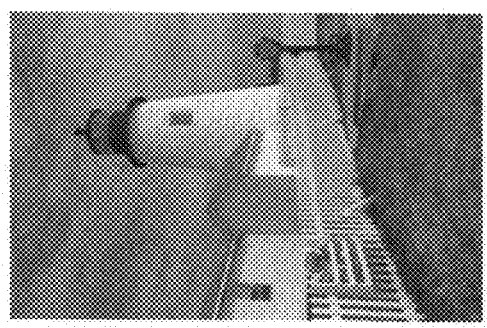
FIG. 7a shows raw (Bayer filtered) images reconstructed from super-resolution.
FIG. 7b shows raw (Bayer filtered) images reconstructed from inter-color and luminance regularization.
FIG. 7c shows raw (Bayer filtered) images reconstructed from chrominance and inter-color regularization.
FIG. 7d shows raw (Bayer filtered) images reconstructed from chrominance and luminance regularization.
Figure 7:
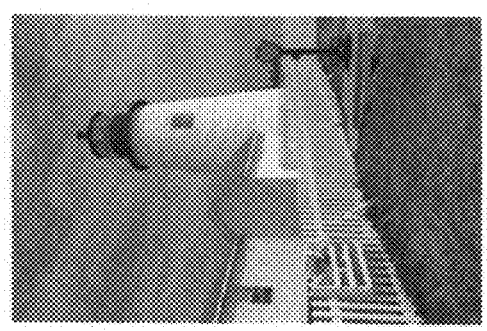
Figure 7:
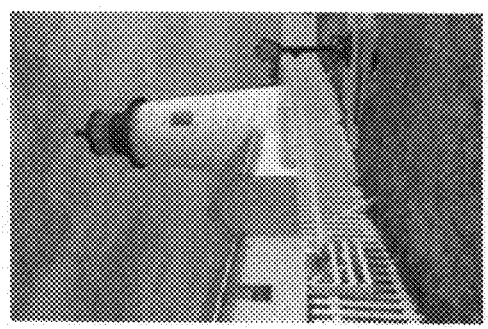
Figure 7:
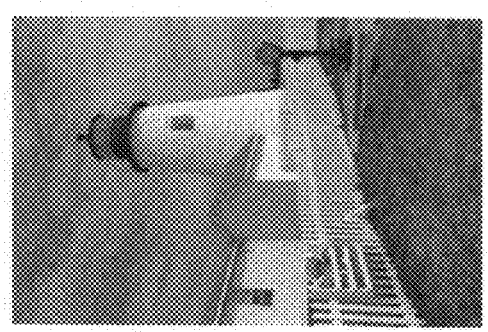
Figure 8:
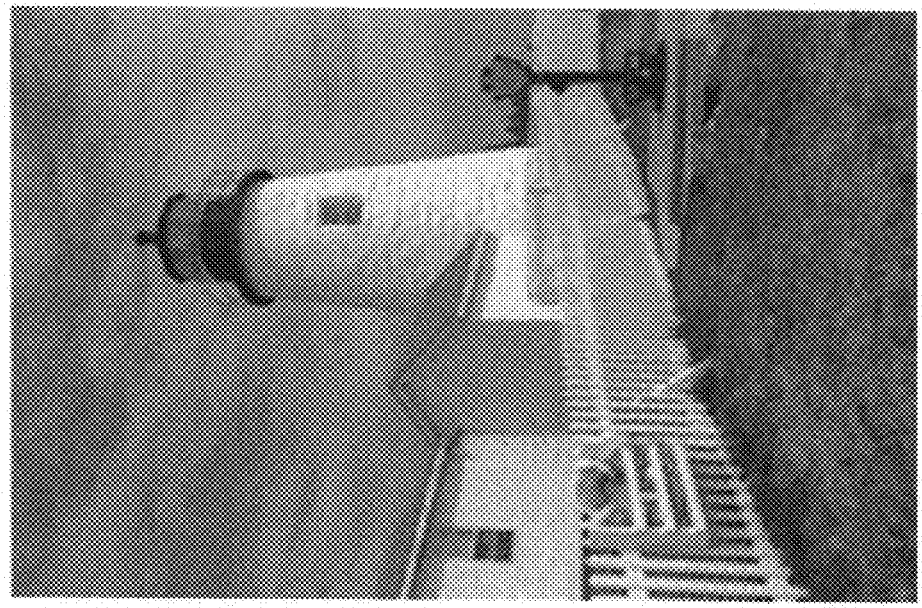
FIG. 8 shows raw (Bayer filtered) images reconstructed with chrominance, luminance and inter-color regularization.

FIGS. 6a-6c show the effect of the individual implementation of each regularization term of the current invention (luminance, chrominance, and inner-color dependencies), where FIG. 6a shows the synthesized low-resolution image from FIG. 5 reconstructed with luminance regularization, FIG. 6b shows the synthesized low-resolution image reconstructed with inter-color regularization, and FIG. 6c shows the synthesized low-resolution image reconstructed with chrominance regularization. Combined smooth hue and gradient-based reconstruction methods were applied to demosaic each of these ten synthesized low-resolution frames individually, and then a robust super-resolution method was applied to each resulting color channel. The result of this method is shown in FIG. 6d. Additionally, the robust super-resolution method was applied on the raw (Bayer filtered) data (before demosaicing). The result of this method is shown in FIG. 7a. To illustrate the effectiveness of each regularization term of the current invention the regularization terms were paired (inter-color dependencies-luminance, inter-color dependencies-chrominance, and luminance-chrominance). FIG. 7b shows raw (Bayer filtered) images reconstructed from inter-color and luminance regularization. FIG. 7c shows raw (Bayer filtered) images reconstructed from chrominance and inter-color regularization. FIG. 7b shows raw (Bayer filtered) images reconstructed from chrominance and luminance regularization. Finally, FIG. 8 shows the result of the modified gradient-based method with the second derivative of the green channel and the first derivative of the red (or blue) channel used to estimate the edge direction in the green channel being implemented with all the terms. The parameters used for this example are $\beta=0.002$, $\alpha=0.9$, $\lambda'=0.01$, $\lambda''=150$, $\lambda'''=1$. It is evident that the resulting image in FIG. 8 has better quality than the input low-resolution frames or other the reconstruction method, for example the images shown in FIG. 2.

Figure 9:
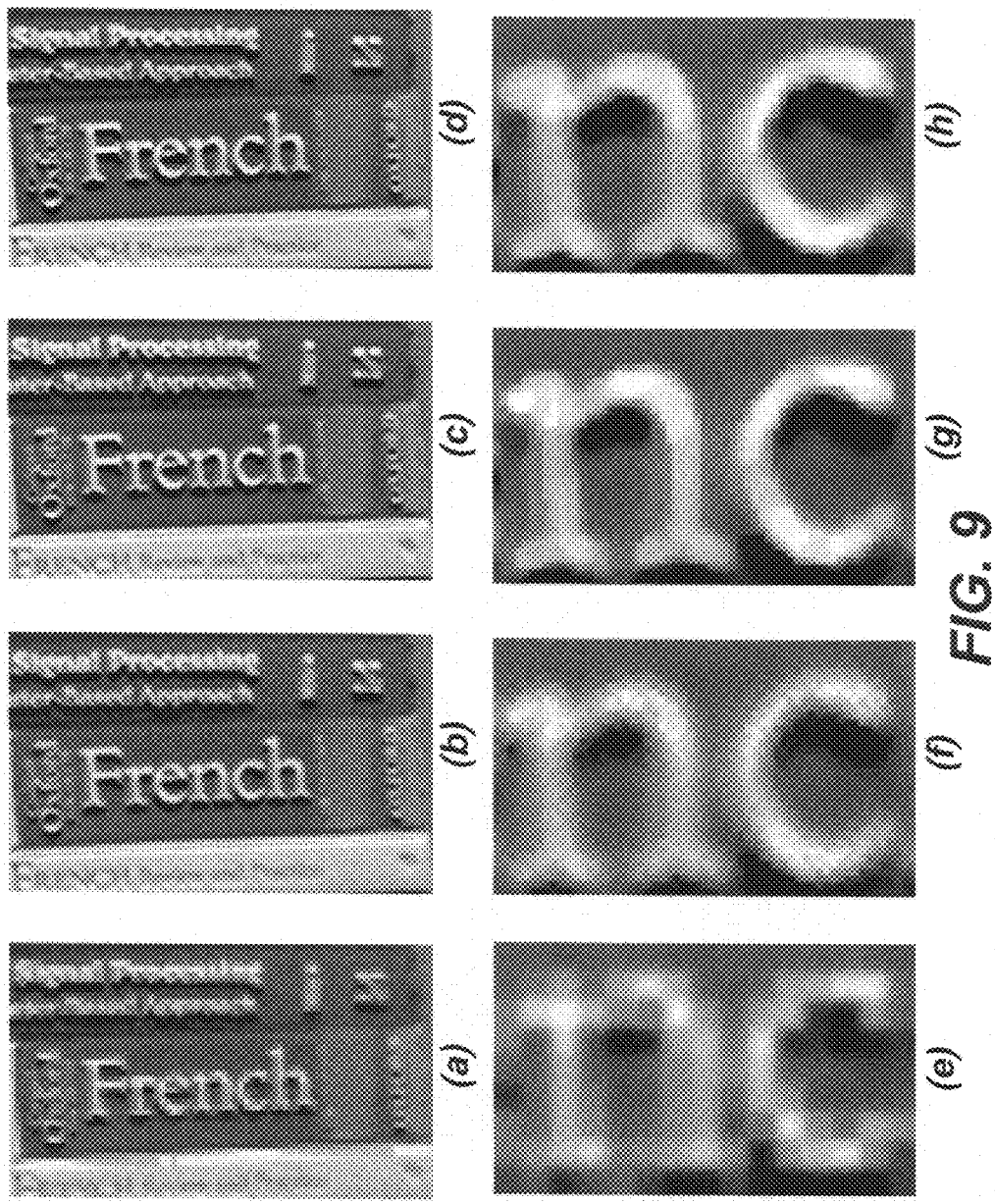

Quantitative measurements confirm the efficacy of the current invention. Peak signal to noise ratio (PSNR) and a spatial extension of CIELAB (S-CIELAB) measurements were taken to compare the performance of each of the previous methods of demosaicing and super-resolution with the methods of the current invention. Table 1. shows these values, where the method according to the current invention has the lowest S-CIELAB error and the highest PSNR values, in addition to the best visual quality.

zoomed in FIG. 9e) and this set of frames were already demosaiced. These samples were selected because they provide a real image with very apparent color artifacts. No information was available about the original sensor values, making the color enhancement task more difficult. This example is also considered as a multi-frame color super-resolution case. The (unknown) camera PSF was assumed to be a 4×4 Gaussian kernel with standard deviation equal to one. As the relative motion between these images followed the translational model, it was only necessary to estimate the motion between the luminance components of these images, where the motion vectors were computed using an hierachical model-based motion estimator.

The shift-and-add result is shown in FIG. 9b (zoomed in FIG. 9f). The B-TV method discussed earlier was used for increasing the resolution by a factor of 4 in each color band, as shown in FIG. 9c (zoomed in FIG. 9g). The result of applying the method of the current invention in this sequence is shown in FIG. 9d (zoomed in FIG. 9h), where the color artifacts are significantly reduced. The parameters used for this sample experiment are $\beta=0.004$, $\alpha=0.9$, $\lambda'=0.25$, $\lambda''=500$, $\lambda'''=5$.

Figure 10:
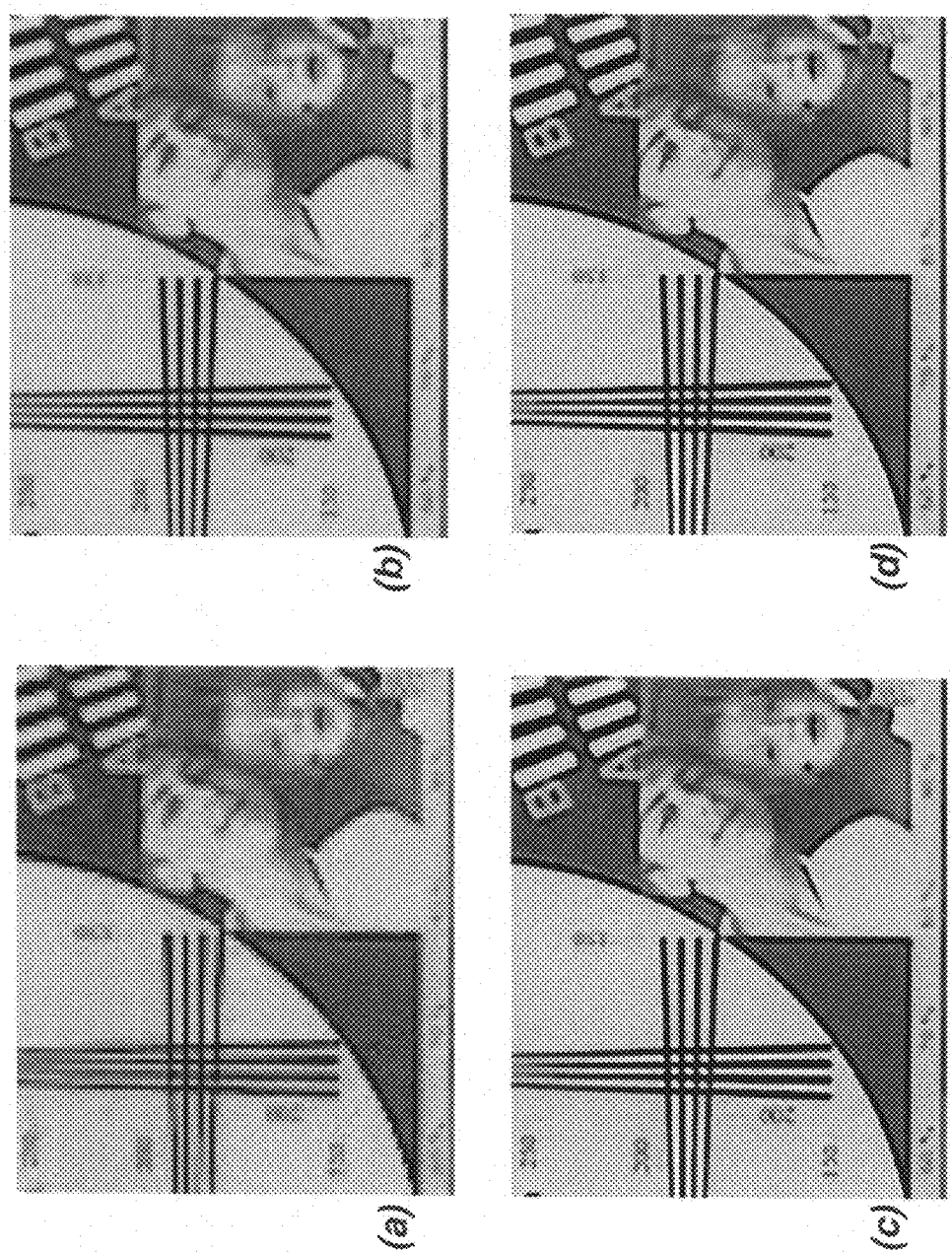
FIG. 10a shows a low-resolution image.
FIG. 10b shows the low-resolution image of FIG. 9a with shift-and-add reconstruction.
FIG. 10c shows the low-resolution image of FIG. 9a with super-resolution applied to each color band.
FIG. 10d shows the low-resolution image of FIG. 9a with a modified gradient-based reconstruction method applied to each color band.
Figure 11:
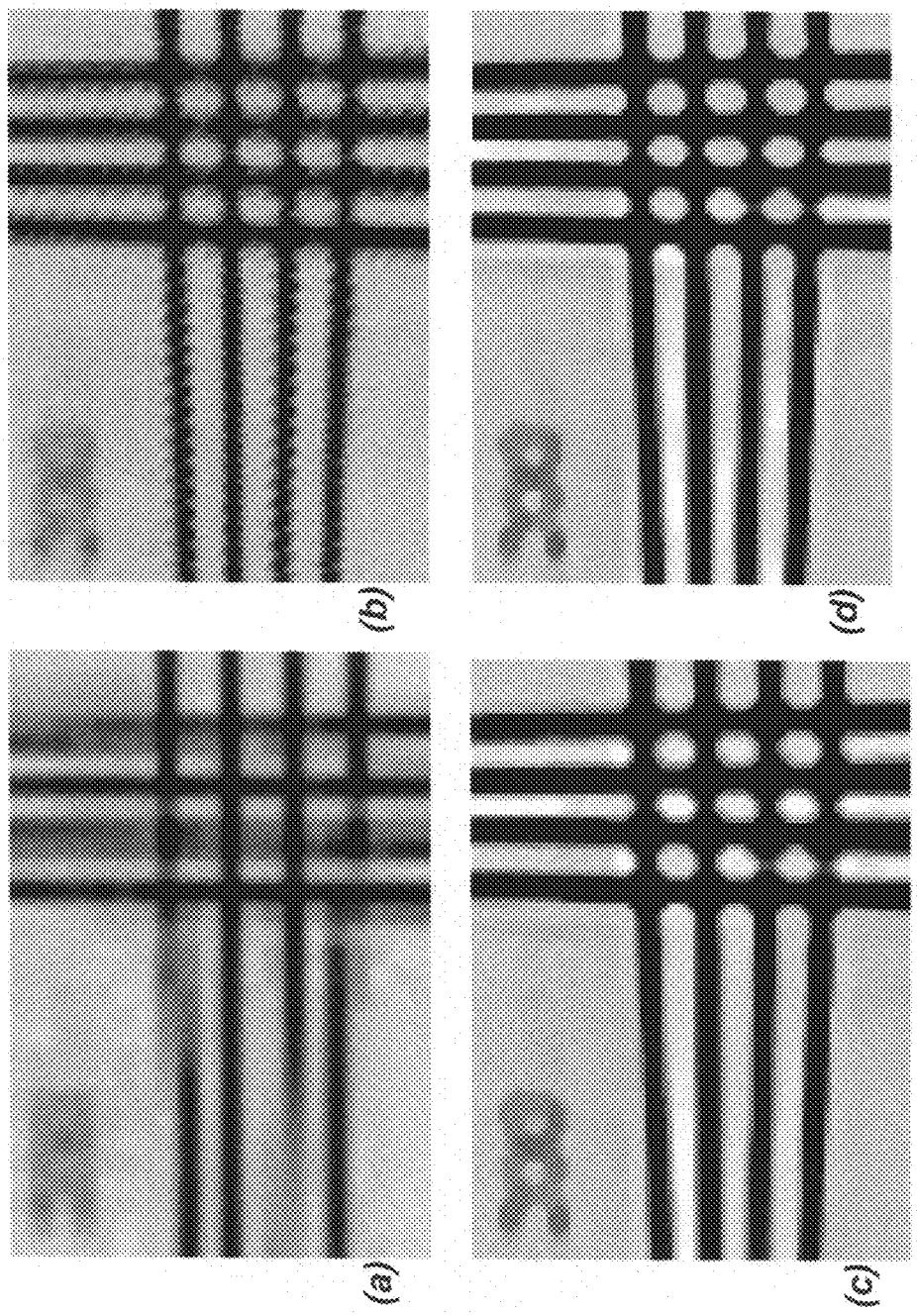

In another sample experiment, 40-compressed images of a test pattern from a commercial surveillance camera were used, where one of these images are shown in FIG. 10a (zoomed in FIG. 11a). The compression and color artifacts are apparent in these images. This set of frames were already demosaiced, and no information was available about the original sensor values. This example is also considered a multi-frame color super-resolution case. The (unknown) camera PSF was assumed to be a 6×6 Gaussian kernel with standard deviation equal to two, where the motion vectors were computed using an hierachical model-based motion estimator.

The shift-and-add result (resolution enhancement factor of 4) is shown in FIG. 10b (zoomed in FIG. 11b). In FIG. 10c (zoomed FIG. 11c). The B-TV method discussed earlier was used for increasing the resolution by a factor of 4 in each color band, independently. The result of applying the methods of the current invention, on this sequence is shown in FIG. 10d (zoomed in FIG. 11d), where color artifacts are significantly reduced. Moreover, comparing FIGS. 10a-10d, the compression errors have been removed more effectively in FIG. 10d. The parameters used for this sample experiment are $\beta=0.004$, $\alpha=0.9$, $\lambda'=0.25$, $\lambda''=500$, $\lambda'''=5$.

TABLE 1

Quantative comparison or the performance of different demosaicing methods on the Lighthouse sequence. The current invention has the lowest S-CIELAB error and the highest PSNR value.

|  | Shift-And-Add | LR Demosaiced [16] + SR [3] | Only Lumin. | Only Orient. | Only Chromin. |
|---|---|---|---|---|---|
| S-CIELAB | $1.532 \times 10^{11}$ | $1.349 \times 10^{11}$ | $7.892 \times 10^{10}$ | $6.498 \times 10^{10}$ | $4.648 \times 10^{10}$ |
| PSNR (dB) | 17.17 | 19.12 | 17.74 | 20.10 | 20.35 |
|  | SR [3] on Raw Data | Lumin. + Orient. | Orient. + Chrom. | Lumin. + Chrom. | Full |
| S-CIELAB | $5.456 \times 10^{10}$ | $4.543 \times 10^{10}$ | $4.382 \times 10^{10}$ | $3.548 \times 10^{10}$ | $3.365 \times 10^{10}$ |
| PSNR (dB) | 19.28 | 20.79 | 20.68 | 21.12 | 21.13 |

Figure 12:
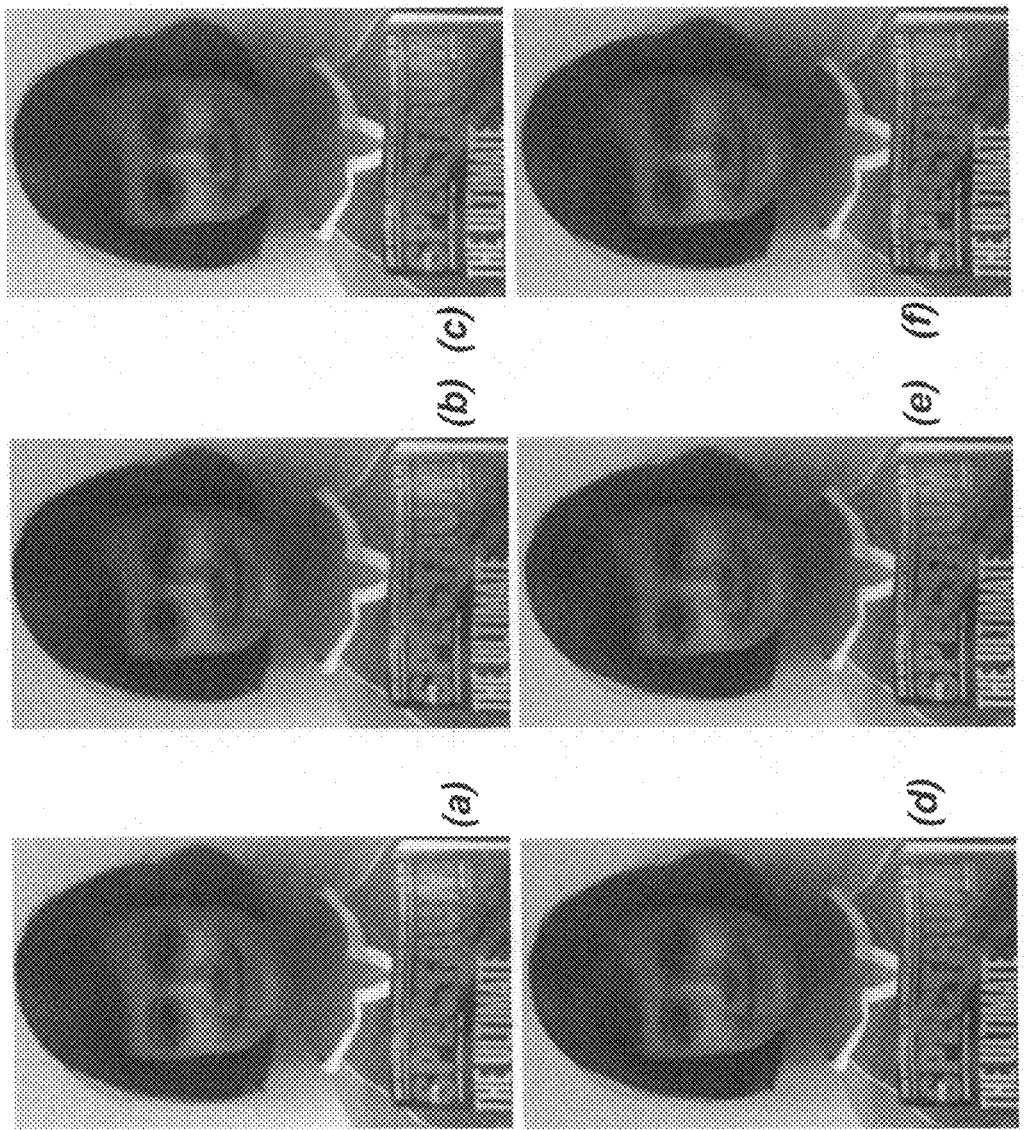
Figure 13:
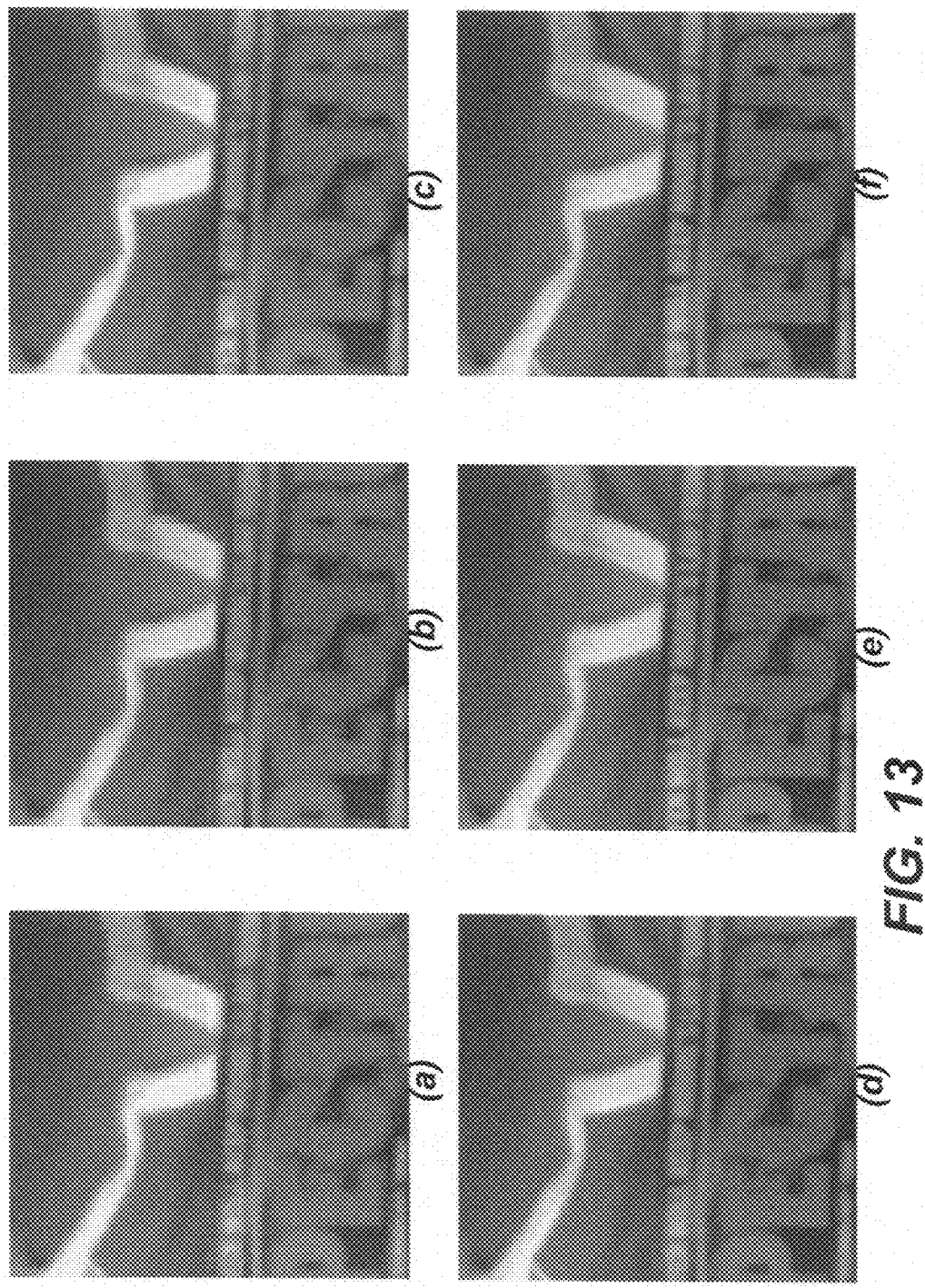
Figure 14:
FIGS. 14a-d shows multi-frame color super resolution implemented on real data sequences according to the present invention.
Figure 16:
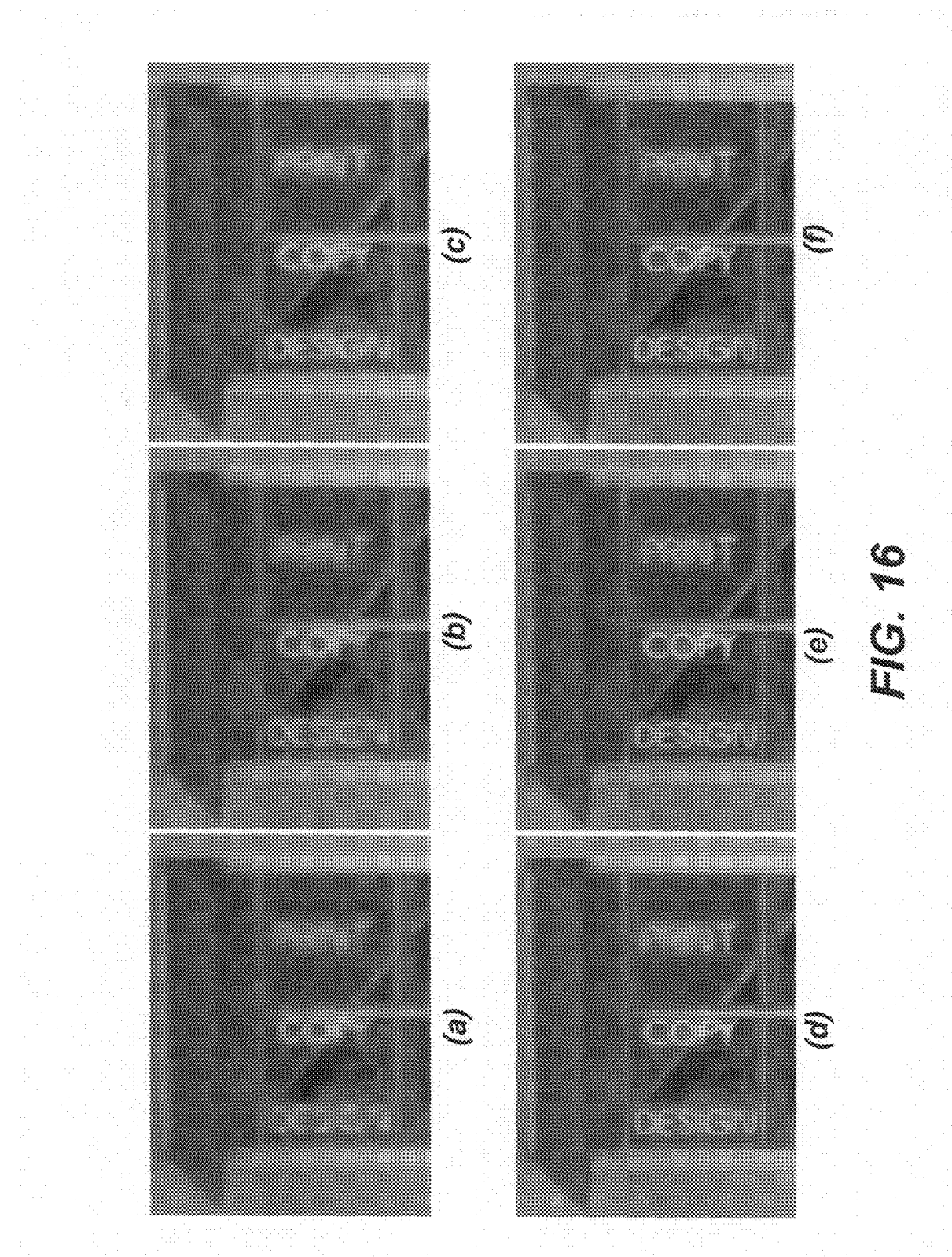
FIGS. 16a-e shows multi-frame color super resolution implemented on real data sequences according to the present invention.

In another sample experiment, 30-compressed images were captured from a commercial webcam, where one of these images are shown in FIG. 9a (a selected region is In the following three sample experiments (girl sequence, bookcase sequence and window sequence), 31-uncompressed, raw CFA images (30-frames for the window sequence of FIG. 16) from a video camera (based on Zoran 2MP CMOS sensors). The gradient-based method was used to demosaic each of the low-resolution frames, individually. FIG. 12a (zoomed in FIG. 13a), shows one of these images from the "girl" sequence (corresponding image of the "bookcase" sequence is shown in FIG. 14a, and the corresponding "window" sequence is shown in FIG. 16a). The result of the more sophisticated combined smooth hue and gradient-based reconstruction method applied to one of these images is shown in FIG. 12b (zoomed in FIG. 13b), depicting the "girl" sequence. FIG. 14b shows the corresponding for the "bookcase" sequence, and FIG. 16b shows the corresponding image for the "window sequence".

To increase the spatial resolution by a factor of three, the multi-frame color super-resolution method of the current invention was applied on the demosaiced images of these sequences. FIG. 12c shows the high-resolution color super-resolution result from the low-resolution color images of the "girl" sequence, demosaiced by the combined smooth hue and gradient-based reconstruction method (zoomed in FIG. 12c). FIG. 14c shows the corresponding image for the "bookcase" sequence, and FIG. 16c shows the corresponding image for the "window" sequence. Similarly, FIG. 12b shows the result of the resolution enhancement of the low-resolution color from the "girl" sequence demosaiced by the modified gradient-based method (zoomed in FIG. 13d). FIG. 14d shows the corresponding image for the "bookcase" sequence, and FIG. 16d shows the corresponding image for the "window" sequence.

Figure 15:
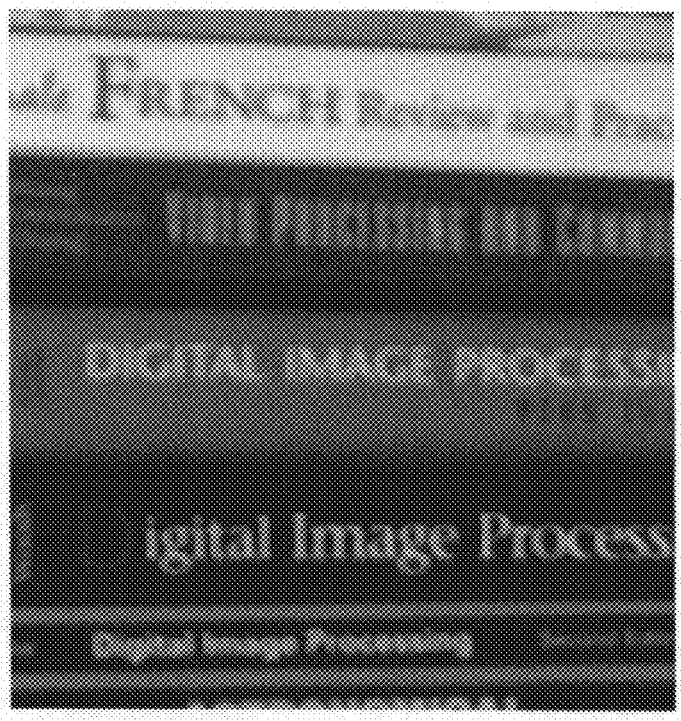
FIGS. 15a-b shows multi-frame color super resolution implemented on real data sequences according to the present invention.
Figure 15:
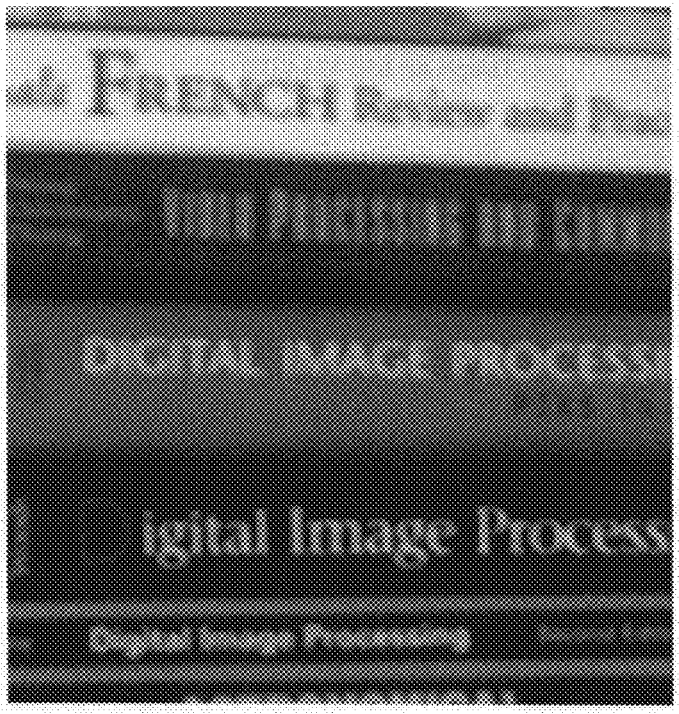

In a final sample experiment, the multi-frame demosaicing method of the current invention was applied on the raw CFA data to increase the spatial resolution by the same factor of three. FIG. 12e shows the high-resolution result of the multi-frame demosaicing of the low-resolution raw CFA images from the "girl" sequence without using the inter-color dependencies term [$J_3(\underline{X})$] (zoomed in FIG. 13e). FIG. 15a shows the corresponding image for the bookcase sequence, and FIG. 16e shows the corresponding image for the "window" sequence. FIG. 12f shows the high-resolution result of applying the multi-frame demosaicing method of the current invention using all terms in the modified gradient-based method on the low-resolution CFA images from the "girl" sequence (zoomed in FIG. 13f). FIG. 15b shows the corresponding image for the "bookcase" sequence and FIG. 16f shows the corresponding image for the "window" sequence.

These sample experiments show that single frame demosaicing methods, such as combined smooth hue and gradient-based reconstruction methods (which in effect implement anti-aliasing filters) remove color artifacts at the expense of making the images more blurry. The color super-resolution methods of the current invention can retrieve some high-frequency information and further remove the color artifacts. Further, applying the multi-frame demosaicing and super-resolution method of the current invention directly to raw CFA data produces sharpest results and removes color artifacts. Additionally, these sample experiments show the importance of the inter-color dependencies term, which further removes color artifacts. The parameters used for the experiments on the "girl", "bookcase" and "window" sequences are $\beta=0.002$, $\alpha=0.9$, $\lambda'=0.1$, $\lambda''=250$, $\lambda'''=25$. The (unknown) camera PSF was assumed to be a tapered 5×5 disk PSF.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, instead of using the L1 norm for penalizing the data fidelity term, other robust penalty terms such as Lorentzian, truncated quadratic, etc. Similarly the median Shift-And-Add operator in the two step process can be replaced by weighted or truncated mean operators.

All such variations are considered to be within the scope and spirit of the present invention as defined by the following claims and their legal equivalents.

What is claimed is:

1. A method of creating a super-resolved color image from a plurality of lower-resolution color images, the method comprising:
   a. enforcing by a computer similarities between raw data and a high-resolution image estimate, wherein said enforcing uses a data fidelity penalty term, wherein said data fidelity penalty term is an L1 norm penalty term;
   b. encouraging by a computer sharp edges in a luminance component to said high-resolution image, wherein said encouraging uses a spatial luminance penalty term;
   c. encouraging by a computer smoothness in a chrominance component of said high-resolution image, wherein said encouraging uses a spatial chrominance penalty term;
   d. encouraging by a computer homogeneity of an edge location and orientation in different color bands, wherein said encouraging uses an inter-color dependencies penalty term; and
   e. a super-resolved color image is displayed on an computer monitor.

2. The method according to claim 1, wherein said data fidelity penalty term is applied to space invariant point spread function, translational, affine, projective and dense motion models wherein said data fidelity penalty term comprises the steps of:
   a. estimating by a computer a blurred higher-resolution image, wherein said estimating comprises fusing said lower-resolution images; and
   b. estimating by a computer a deblurred image from said blurred higher-resolution image, wherein said blurred higher-resolution image is a weighted mean of all measurements of a given pixel after zero filling and motion compensation.

3. The method according to claim 1, wherein said data fidelity penalty term uses motion estimation errors comprising said L1 norm in a likelihood fidelity term.

4. The method according to claim 1, wherein said spatial luminance penalty term uses bilateral-TV regularization.

5. The method according to claim 4, wherein said bilateral TV regularization comprises a luminance image having a weighted sum of color vectors comprising red vectors, green vectors and blue vectors, a horizontal pixel-shift term, a vertical pixel-shift term, and a scalar weight between 0 and 1.

6. The method according to claim 1, wherein said spatial chrominance penalty term uses regularization based on an L2 norm.

7. The method according to claim 1, wherein said inter-color dependencies penalty term comprises a vector outer product norm of all pairs of neighboring pixels.

8. The method according to claim 1, wherein using said computer to combine said data fidelity penalty term, said spatial luminance penalty term, said spatial chrominance penalty term, and said inter-color dependencies penalty term creates an overall cost function.

9. The method according to claim 8, wherein said overall cost function comprises a steepest descent optimization, wherein said steepest optimization is applied for minimization by said computer to said overall cost function comprising the steps of:

a. applying by said computer a derivative to a first color band while having a second and a third color band held constant;
   b. applying by said computer a derivative to said second color band while having said first and said third color band held constant; and
   c. applying by said computer a derivative to said third color band while having said first and said second color band held constant.

10. The method according to claim 1, wherein direct image operator effects comprising blur, high-pass filtering, masking, down-sampling, and shift are implemented by said computer in place of matrices for process speed and memory efficiency.

11. The method according to claim 1, wherein said lower-resolution color images comprise color filtered images, compressed color images, compressed color filtered images, and an image sequence with color artifacts.

12. The method according to claim 1, wherein said method is a computer implemented method.

* * * * *